US011363401B2

(12) United States Patent
Laaksonen et al.

(10) Patent No.: US 11,363,401 B2
(45) Date of Patent: Jun. 14, 2022

(54) ASSOCIATED SPATIAL AUDIO PLAYBACK

(71) Applicant: Nokia Technologies Oy, Espoo (FI)

(72) Inventors: Lasse Laaksonen, Tampere (FI); Antti Eronen, Tampere (FI); Sujeet Shyamsundar Mate, Tampere (FI); Arto Lehtiniemi, Lempaala (FI); Kari Jarvinen, Vantaa (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/960,750

(22) PCT Filed: Jan. 14, 2019

(86) PCT No.: PCT/FI2019/050024
§ 371 (c)(1),
(2) Date: Jul. 8, 2020

(87) PCT Pub. No.: WO2019/141899
PCT Pub. Date: Jul. 25, 2019

(65) Prior Publication Data
US 2020/0344564 A1     Oct. 29, 2020

(30) Foreign Application Priority Data

Jan. 19, 2018    (GB) ..................................... 1800918

(51) Int. Cl.
*H04S 7/00* (2006.01)
*H04R 3/00* (2006.01)
(Continued)

(52) U.S. Cl.
CPC .......... *H04S 7/304* (2013.01); *H04S 2400/15* (2013.01)

(58) Field of Classification Search
None
See application file for complete search history.

(56) References Cited

U.S. PATENT DOCUMENTS 9,338,394 B2    5/2016  Li et al.
2003/0160862 A1*  8/2003  Charlier ............... H04N 5/2627
                                        348/14.08
(Continued)

FOREIGN PATENT DOCUMENTS

CN    101622868 A    1/2010
CN    105592283 A    5/2016
(Continued)

OTHER PUBLICATIONS

Fug, Simone, et al., "Proposal for processing of 3D Audio for 360 video content", ISO/IEC JTCI/SC29/WG11 MPEG2015/M37202, Oct. 2015, 17 pgs.

(Continued)

*Primary Examiner* — Qin Zhu
(74) *Attorney, Agent, or Firm* — Harrington & Smith

(57) ABSTRACT

An apparatus including at least one processor and at least one memory including computer code for one or more programs, the at least one memory and the computer code configured, with the at least one processor, to cause the apparatus at least to: generate audio effect information, wherein the audio effect information enables control of audio signal processing associated with audio signals related to one or more audio sources based on at least a zooming factor.

20 Claims, 9 Drawing Sheets

(51) Int. Cl.
*G06F 3/01* (2006.01)
*G06F 3/16* (2006.01)
*H04N 21/442* (2011.01)
*H04N 21/485* (2011.01)
*H04N 21/81* (2011.01)
*H04N 21/439* (2011.01)

(56) References Cited

U.S. PATENT DOCUMENTS

| | | | |
|---|---|---|---|
| 2008/0298597 A1 | 12/2008 | Turku et al. | 381/27 |
| 2010/0111499 A1 | 5/2010 | Tsurumi | |
| 2011/0129095 A1* | 6/2011 | Avendano | H04R 3/005 |
| | | | 381/63 |
| 2012/0230512 A1 | 9/2012 | Ojanpera | 381/92 |
| 2013/0016842 A1 | 1/2013 | Schultz-Amling et al. | 381/17 |
| 2013/0249947 A1* | 9/2013 | Reitan | G06F 3/011 |
| | | | 345/633 |
| 2013/0342730 A1 | 12/2013 | Lee et al. | |
| 2013/0342731 A1* | 12/2013 | Lee | H04N 5/232127 |
| | | | 348/231.4 |
| 2014/0348342 A1* | 11/2014 | Laaksonen | H04R 3/005 |
| | | | 381/92 |
| 2015/0063610 A1 | 3/2015 | Mossner | 381/307 |
| 2016/0066091 A1* | 3/2016 | Kum | H04R 3/005 |
| | | | 381/92 |
| 2016/0183024 A1 | 6/2016 | Karkkainen et al. | |
| 2017/0230760 A1 | 8/2017 | Sanger et al. | |
| 2017/0318387 A1* | 11/2017 | Ray | H04S 1/002 |
| 2018/0007489 A1 | 1/2018 | Lehtiniemi et al. | 7/303 |
| 2018/0098173 A1* | 4/2018 | van Brandenburg | H04S 7/303 |
| 2018/0199020 A1* | 7/2018 | Lindahl | H04N 21/41407 |
| 2020/0128232 A1* | 4/2020 | Hwang | H04N 5/23293 |

FOREIGN PATENT DOCUMENTS

| | | |
|---|---|---|
| CN | 107211216 A | 9/2017 |
| EP | 2 464 127 | 6/2012 |
| WO | WO-2017/037032 A1 | 3/2017 |
| WO | WO-2017/055348 A1 | 4/2017 |
| WO | WO 2017/178309 A1 | 10/2017 |

OTHER PUBLICATIONS

"3rd Generation Partnership Project; Technical Specification Group Services and System Aspects; Virtual Reality (VR) media services over 3GPP (Release 15)", 3GPP TR 26.918 V15.1.0, Dec. 2017, 119 pgs.

* cited by examiner

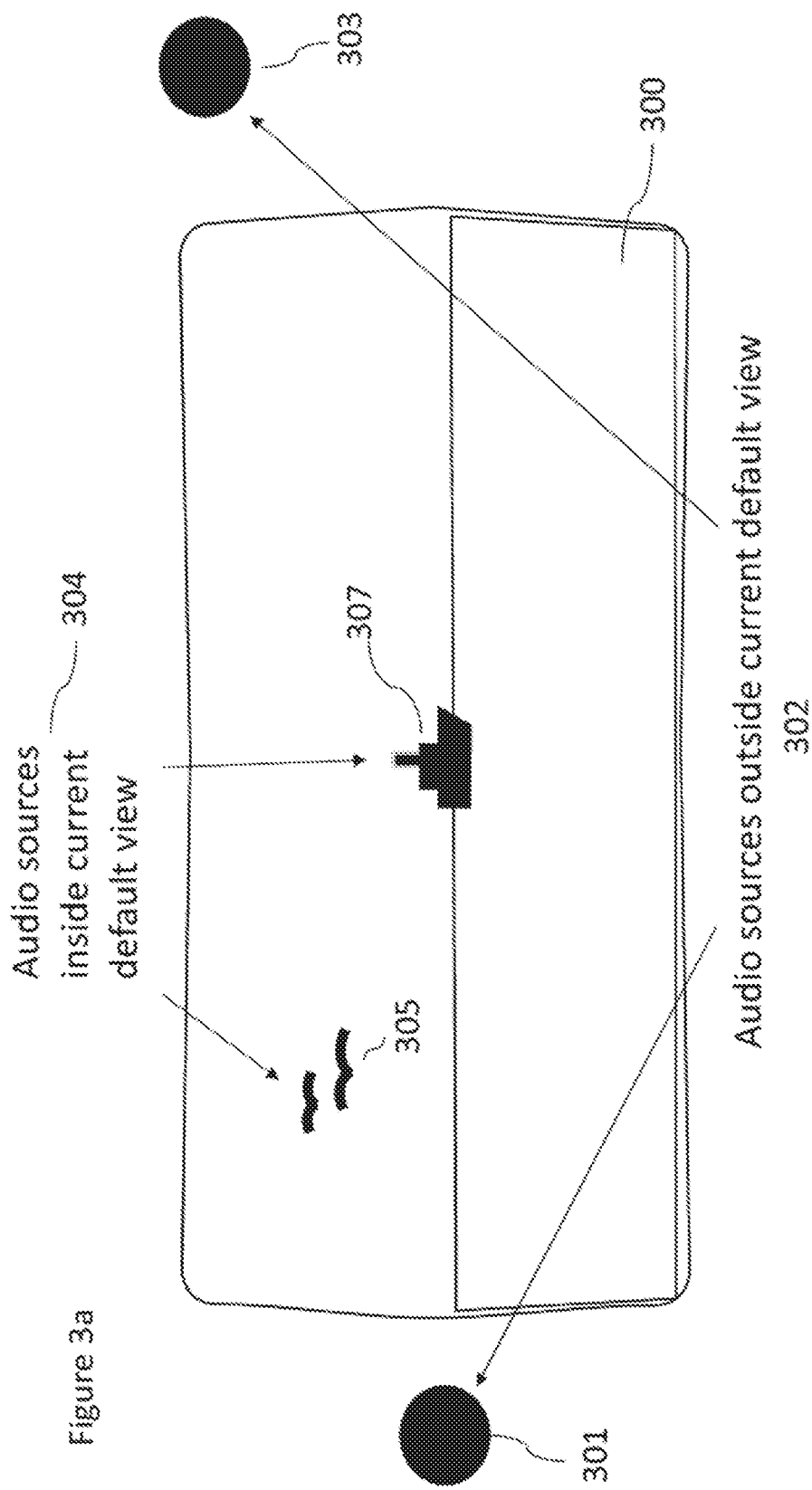

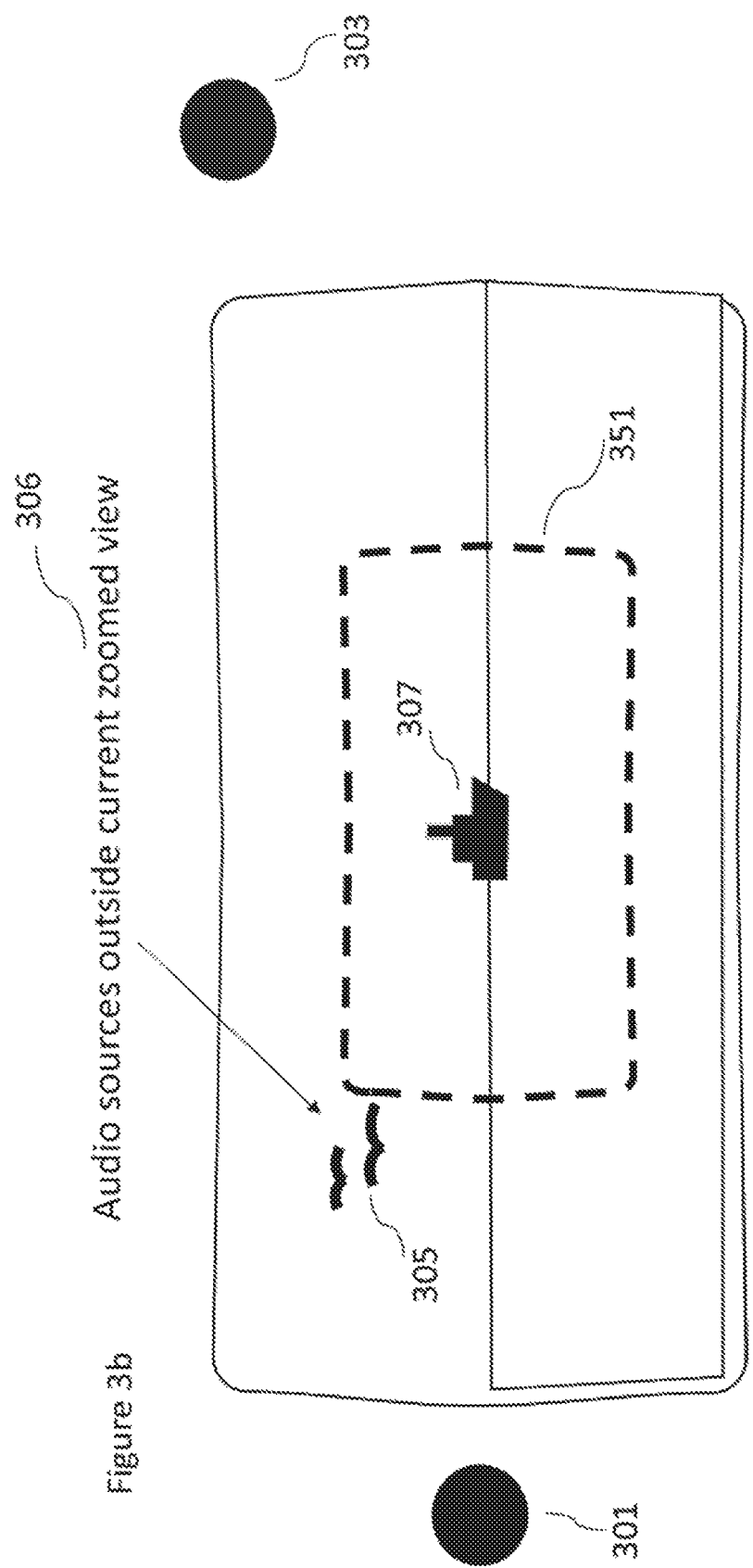

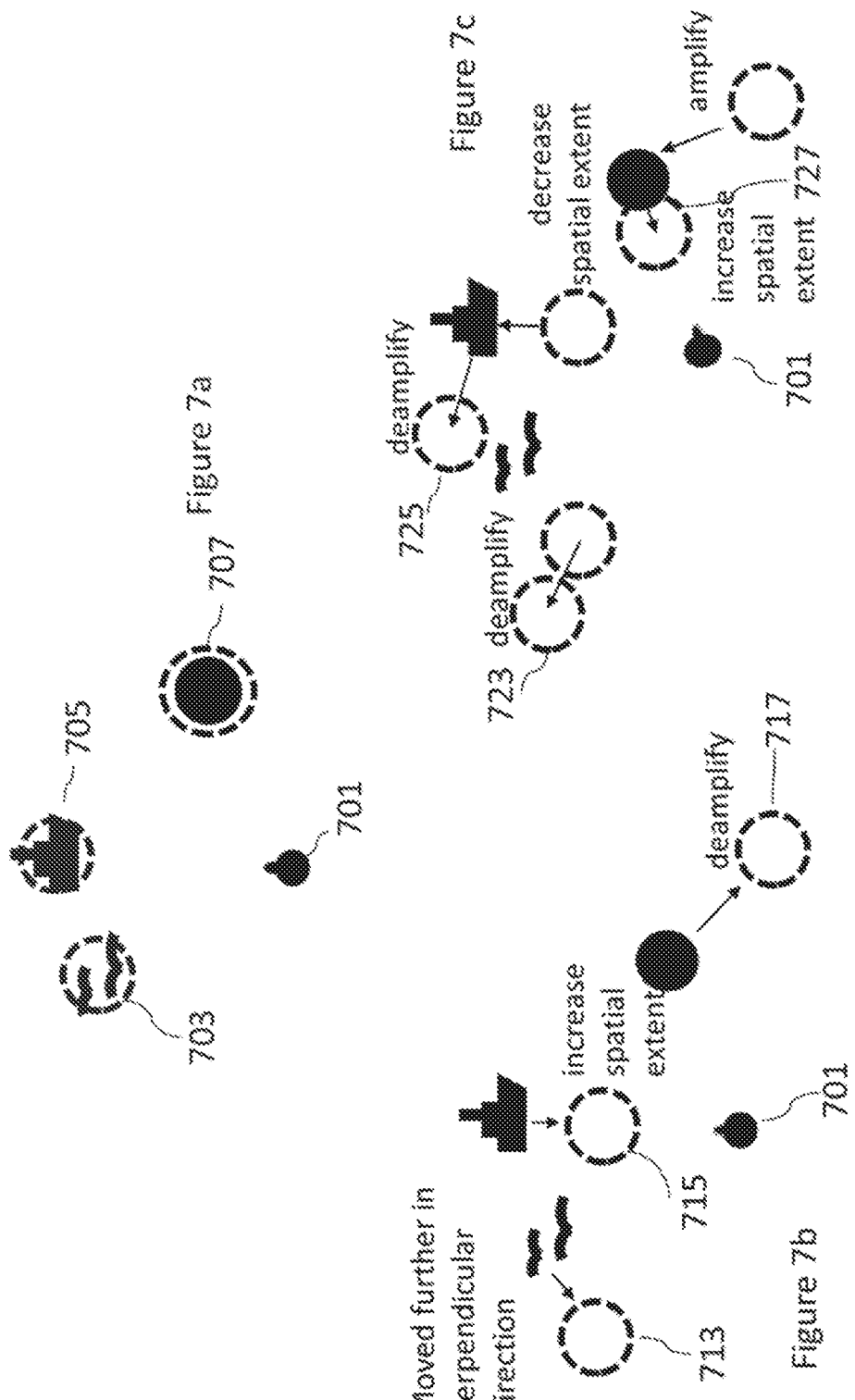

ASSOCIATED SPATIAL AUDIO PLAYBACK

CROSS REFERENCE TO RELATED APPLICATION

This patent application is a U.S. National Stage application of International Patent Application Number PCT/FI2019/050024 filed Jan. 14, 2019, which is hereby incorporated by reference in its entirety, and claims priority to GB 1800918.3 filed Jan. 19, 2018.

FIELD

The present application relates to apparatus and methods for spatial audio playback.

BACKGROUND

In a 3D space, there are six degrees of freedom defining the way a user may move within said space. This movement is divided into two categories: rotational and translational movement (with three degrees of freedom each). Rotational movement is sufficient for a simple virtual reality (VR) experience where the user may turn their head (pitch, yaw, and roll) to experience the space from a static point. Translational movement means that the user may also change the position of the rendering. In other words move along the x, y, and z axes according to their wishes. Free-viewpoint augmented reality (AR) and VR experiences allow for both rotational and translational movements.

It is common to talk about the degrees of freedom (and the related experiences) using the terms 3DoF (three degrees of freedom), 3DoF+ and 6DoF (six degrees of freedom). 3DoF+ falls somewhat between 3DoF and 6DoF in that it allows for some limited user movement, for example a restricted translational degree of freedom while allowing full range of motion for the rotational movement. Thus 3DoF+ can sometimes be considered to implement a restricted 6DoF where the user is sitting down but can lean their head in various directions.

The ISO/IEC Moving Picture Experts Group (MPEG) is currently standardizing immersive media technologies under the name MPEG-I. This includes methods for various virtual reality (VR), augmented reality (AR) or mixed reality (MR) use cases. MPEG-I is divided into three phases: Phases 1a, 1b, and 2. Phases 1a and 1b consider 3DoF and 3DoF+ use cases, and Phase 2 will then allow at least significantly unrestricted 6DoF. For audio standardization, the focus is already on 6DoF audio, as existing methods are thought to cover at least significant parts of the 3DoF/3DoF+ use cases. However, there are certain aspects where at least 3DoF+ (Phase 1b) standards will require further development.

Immersive or spatial audio (for 3DoF/3DoF+/6DoF) may consist of various audio signals and information. For example a channel-based bed and audio objects, first-order or higher-order ambisonics (FOA/HOA) and audio objects, any combination of these such as audio objects only, or any equivalent spatial audio representation may be used. These audio signals may be carried as MPEG-H 3D Audio, specified as ISO/IEC 23008-3 (MPEG-H Part 3), audio coding standard, along with additional metadata and new rendering technology which will constitute the MPEG-I Audio standard.

SUMMARY

There is provided according to a first aspect an apparatus comprising at least one processor and at least one memory including computer code for one or more programs, the at least one memory and the computer code configured, with the at least one processor, to cause the apparatus at least to: generate audio effect information, wherein the audio effect information enables control of audio signal processing associated with audio signals related to one or more audio sources based on at least a zooming factor.

The apparatus caused to generate audio effect information may be caused to generate at least one of: an identifier configured to identify at least one audio source; and at least one audio signalling processing effect to be applied based on a classification of the at least one audio source.

The at least one audio signalling processing effect comprises at least one of: an emphasis in gain; a de-emphasis in gain; an increase in spatial extent; and a decrease in spatial extent.

The classification of the at least one audio source may be at least: a first classification where the at least audio source is within a first viewport for a first zoom factor and within a second viewport for a second zoom factor; a second classification where the at least audio source is not within a first viewport for a first zoom factor but within a second viewport for a second zoom factor; a third classification where the at least audio source is not within a first viewport for a first zoom factor and not within a second viewport for a second zoom factor.

The apparatus may be further caused to: obtain the audio signals related to the one or more audio sources; analyse the audio signals to generate information related to the one or more audio sources; transmit the audio signals, information related to the one or more audio sources and the audio effect information to at least one further apparatus.

The apparatus caused to obtain the audio signals related to the one or more audio sources may be caused to perform at least one of: capture the audio signals; and receive the audio signals from at least one audio capture apparatus.

The apparatus may be further caused to: capture at least one image, the image being associated with the one or more audio sources; and transmit the at least one image with the audio signals, information related to the one or more audio sources and the audio effect information to the at least one further apparatus.

The apparatus caused to transmit the audio signals, information related to the one or more audio sources and the audio effect information to at least one further apparatus may be caused to transmit the audio effect information as one of: in-band information with the audio signals; and out-of-band information with the audio signals.

According to a second aspect there is provided an apparatus comprising at least one processor and at least one memory including computer code for one or more programs, the at least one memory and the computer code configured, with the at least one processor, to cause the apparatus at least to: receive at least one audio signal; receive information associated with at least one audio source; receive audio effect information, the audio effect information associated with at least one audio source; and process the at least one audio signal based on the information associated with at least one audio source and audio effect information, further based on a classification of the at least one audio source.

The apparatus caused to process the at least one audio signal based on the information associated with at least one audio source and audio effect information, further based on a classification of the at least one audio source may be caused to: determine a first viewport based on an obtained position and rotation; determine a second viewport based on the obtained position and rotation and a zoom factor; classify at least one audio source based on the information associated with at least one audio source and the first and second viewport; select at least one audio signalling processing effect to be applied based on the classification of the at least one audio source.

The apparatus caused to receive audio effect information may be caused to receive at least one of: an identifier configured to identify at least one audio source; and at least one audio signalling processing effect to be applied based on a classification of the at least one audio source.

The at least one audio signalling processing effect may comprise at least one of: an emphasis in gain; a de-emphasis in gain; an increase in spatial extent; and a decrease in spatial extent.

The classification of the at least one audio source may be at least: a first classification where the at least audio source is within a first viewport for a first zoom factor and within a second viewport for a second zoom factor; a second classification where the at least audio source is not within a first viewport for a first zoom factor but within a second viewport for a second zoom factor; a third classification where the at least audio source is not within a first viewport for a first zoom factor and not within a second viewport for a second zoom factor.

The apparatus may be further caused to: receive at least one image; apply the second viewport to the at least one image to generate an output image; and display the output image.

The apparatus may be further caused to output the processed at least one audio signal as a rendered audio signal.

According to a third aspect there is provided a method comprising: generating audio effect information, wherein the audio effect information enables control of audio signal processing associated with audio signals related to one or more audio sources based on at least a zooming factor.

Generating audio effect information may comprise generating at least one of: an identifier configured to identify at least one audio source; and at least one audio signalling processing effect to be applied based on a classification of the at least one audio source.

The at least one audio signalling processing effect may comprise at least one of: an emphasis in gain; a de-emphasis in gain; an increase in spatial extent; and a decrease in spatial extent.

The classification of the at least one audio source may be at least one of: a first classification where the at least audio source is within a first viewport for a first zoom factor and within a second viewport for a second zoom factor; a second classification where the at least audio source is not within a first viewport for a first zoom factor but within a second viewport for a second zoom factor; a third classification where the at least audio source is not within a first viewport for a first zoom factor and not within a second viewport for a second zoom factor.

The method may further comprise: obtaining the audio signals related to the one or more audio sources; analysing the audio signals to generate information related to the one or more audio sources; transmitting the audio signals, information related to the one or more audio sources and the audio effect information to at least one further apparatus.

Obtaining the audio signals related to the one or more audio sources may comprise at least one of: capturing the audio signals; and receiving the audio signals from at least one audio capture apparatus.

The method may further comprise: capturing at least one image, the image being associated with the one or more audio sources; and transmitting the at least one image with the audio signals, information related to the one or more audio sources and the audio effect information to the at least one apparatus.

Transmitting the audio signals, information related to the one or more audio sources and the audio effect information to at least one apparatus may comprise transmitting the audio effect information as one of: in-band information with the audio signals; and out-of-band information with the audio signals.

According to a fourth aspect there is provided a method comprising: receiving at least one audio signal; receiving information associated with at least one audio source; receiving audio effect information, the audio effect information associated with at least one audio source; and processing the at least one audio signal based on the information associated with at least one audio source and audio effect information, further based on a classification of the at least one audio source.

Processing the at least one audio signal based on the information associated with at least one audio source and audio effect information, further based on a classification of the at least one audio source may comprise: determining a first viewport based on an obtained position and rotation; determining a second viewport based on the obtained position and rotation and a zoom factor; classifying at least one audio source based on the information associated with at least one audio source and the first and second viewport; selecting at least one audio signalling processing effect to be applied based on the classification of the at least one audio source;

Receiving audio effect information may comprise receiving at least one of: an identifier configured to identify at least one audio source; and at least one audio signalling processing effect to be applied based on a classification of the at least one audio source.

The at least one audio signalling processing effect may comprise at least one of: an emphasis in gain; a de-emphasis in gain; an increase in spatial extent; and a decrease in spatial extent.

The classification of the at least one audio source may be at least one of: a first classification where the at least audio source is within a first viewport for a first zoom factor and within a second viewport for a second zoom factor; a second classification where the at least audio source is not within a first viewport for a first zoom factor but within a second viewport for a second zoom factor; a third classification where the at least audio source is not within a first viewport for a first zoom factor and not within a second viewport for a second zoom factor.

The method may further comprise: receiving at least one image; applying the second viewport to the at least one image to generate an output image; and displaying the output image.

The method may comprise outputting the processed at least one audio signal as a rendered audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 3a shows schematically a user view of the example shown in FIG. 1a;

FIG. 3b shows schematically a user view of the example shown in FIG. 1b;

FIGS. 7a to 7c shows example audio modifications for the scene shown in FIGS. 6a to 6c;

EMBODIMENTS OF THE APPLICATION

The following describes in further detail suitable apparatus and possible mechanisms for the provision of effective spatial signal playback. Specifically the following describes apparatus and mechanisms for the provision of zooming in and out for VR360 with (at least rotational) DoF where a viewing resolution/quality is aimed to be kept constant. In some embodiments the apparatus and mechanisms may applied to 3DoF, 3DoF+ and 6DoF augmented and virtual reality applications.

This means that the user is able to zoom into or out of a scene at the pre-defined/current viewpoint (in other words change the field of view of visual rendering). As discussed above the act of zooming is valid for any scenario (3DOF/3DOF+/6DOF), and zooming by definition affects the field of view only.

Zooming may happen at the same time as a rotation or translation. Thus the user may be able to apply rotational DoF motion to the altered point of view (in other words change the direction of the angle of view also during zooming). In some situations for 3DoF+/6DoF content, even if perspective changes slightly due to the motion of the user this may not be significant compared to objects which may be further away.

Figure 1C:
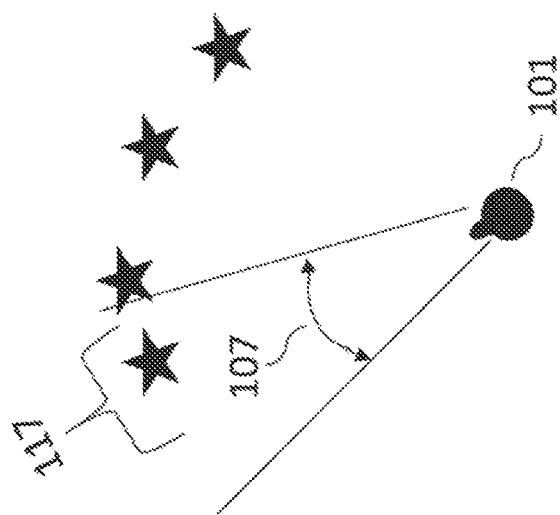
FIGS. 1a to 1c show examples of zooming and rotation within a VR/AR environment.
Figure 1B:
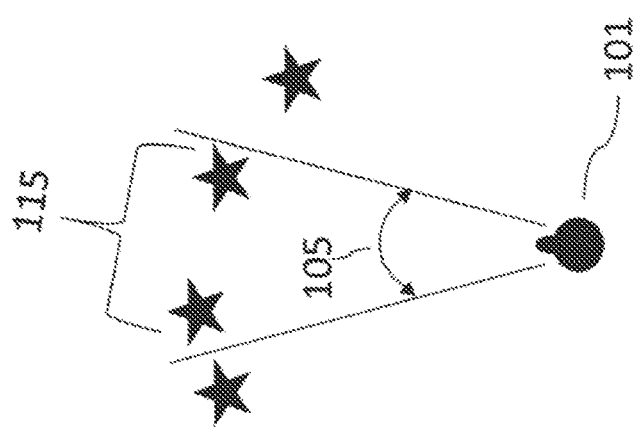
Figure 1A:
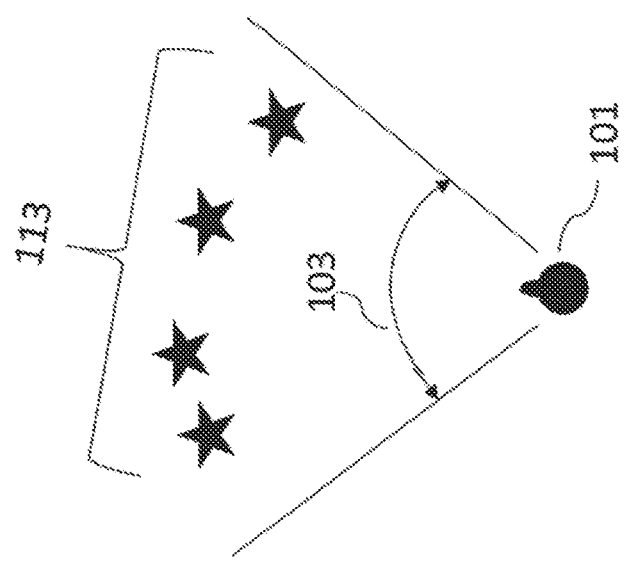

This is shown for example with respect to FIGS. 1a to 1c which show an example of zooming and rotation which would be possible to implement using embodiments as described hereafter.

FIG. 1a for example shows a plan view of a user 101 with a field of view 103 which contains the objects within the VR system. The example shown in FIG. 1a is such that the field of view 103 is able to contain all 113 of the objects.

FIG. 1b shows the same scene but where the user 101 is zooming onto the central two objects 115. As such the zoom operation produces a reduced field of view 105. The reduced field of view 105 and original field of view however are common in that the centre of each is substantially the same, in other words there is no rotation of the field of view from the original field of view 103 to the reduced or zoomed field of view 105.

FIG. 1c shows the same scene as FIGS. 1a and 1b but where the user has rotated the zoomed field of view to concentrate on the left object 117. As such the user 101 has a rotated reduced field of view 107, which has the same range as the reduced field of view 105 but rotated anticlockwise.

This zooming and rotation may have implications on user experience and content creator choice with respect to audio signals. These implications are taken into account in the embodiments as discussed herein and an enhanced user experience and content creator control enabled.

Thus as it is clear from FIGS. 1a to 1c that a zooming operation may temporarily alter the relative importance of scene elements for the user. For example where the user is interested in certain scene elements, the user is likely to apply a zoom operation to view such elements in better detail (and to crop out less interesting scene elements and directions). This for example may be reflected in the audio environment by the emphasis of audio signals associated with such elements and de-emphasis of audio signals associated with elements outside of the zoom.

However, when considering the zooming operation in the physical environment (compared to the virtual environment) it is noted that the user's perspective is unchanged going from the position shown in FIG. 1a to the position shown in FIG. 1b. The physical perspective is changed only via rotation such as shown in FIG. 1c. Therefore this physical environment change may be reflected in an audio rendering which is not based on the viewpoint of the user (while zooming in or out of the content) and thus an VR system may be configured to take into account the explicit or implicit change in relative importance of the scene elements whether or not there has been any physical environment change.

This change may relate to audio content, and in many application areas (such as VR environments or AR advertisements) it can be considered commercially very valuable for the content creators.

The concept as discussed in further detail hereafter is apparatus and methods for signalling and rendering audio modifications related to video zooming and rotation (and also translation) of viewpoint/listening positions. The embodiments as discussed hereafter further relate to AR/VR audio (audio-visual) content creation tools and content creator controls over the rendering and user experience.

Thus as discussed hereafter when a zooming operation is in effect, a dynamic classification of audio sources to be rendered is carried out based on the video viewport (or a similar "audio beam" in case of audio-only use). Based on the classification result and metadata related to the audio sources, an audio rendering modification is carried out for at least one audio source (such as an audio object).

In other words in some embodiments when a default audio-visual viewing takes place, a default audio rendering is implemented. When a zooming operation is initialised, an audio classification begins in order to carry out an audio rendering modification that optimizes the "zoomed-in" immersion of the current audio scene. This "optimization" processing can in some embodiments be controlled at least partly by the content creator.

In some embodiments the audio scene rendering modification may be specified and signalled in addition to the default audio content. In such situations this allows the rendering client to utilize the specified effect of the zooming operation on audio rendering.

Implementing the method and apparatus shown in these embodiments thus improves user experience and content creation capabilities, and therefore provides commercial value.

Figure 2:
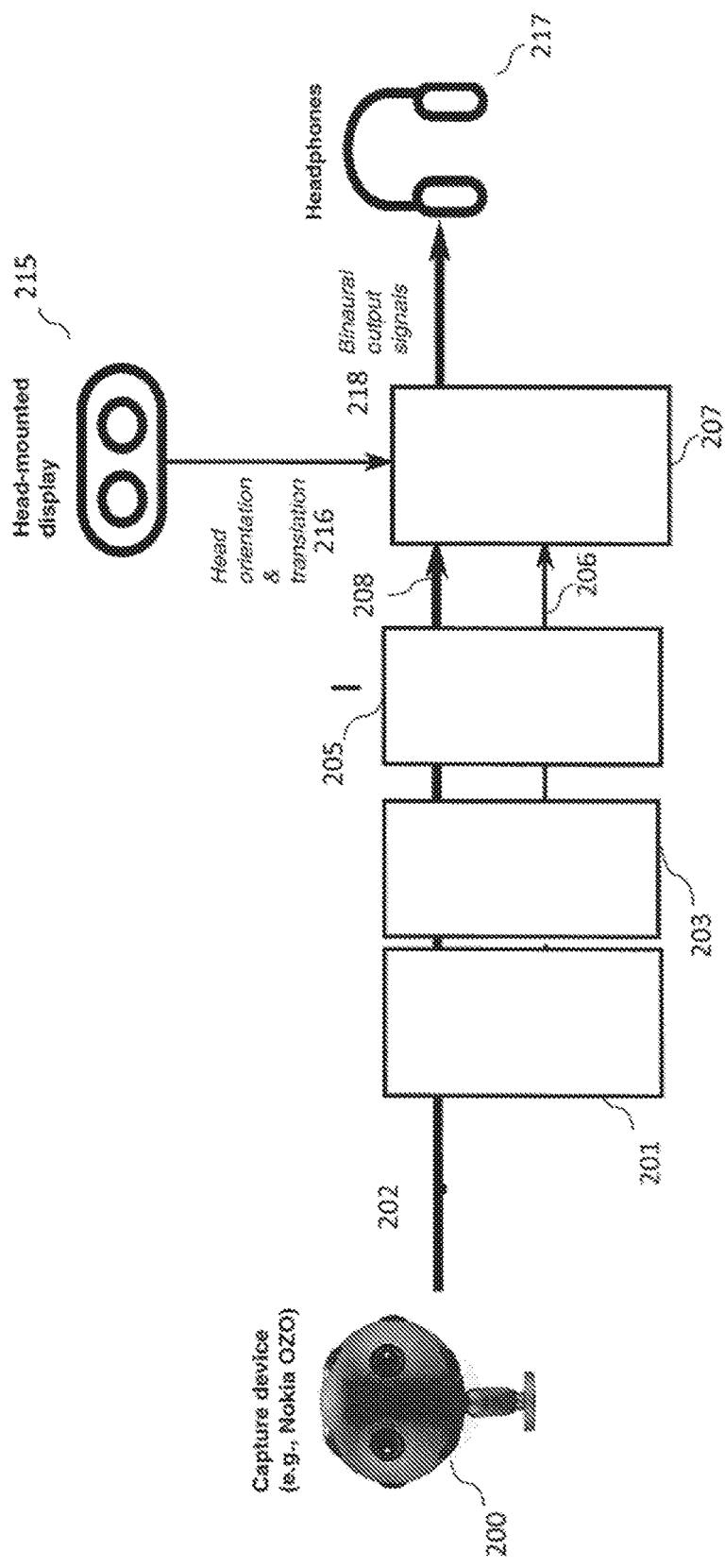
FIG. 2 shows schematically an example of a system suitable for implementing apparatus according to some embodiments.

With respect to FIG. 2 is shown an example overview system and which shows an end to end workflow as well as content consumption.

The system comprises a capture device 200, a content processor 201, a content distributor formatter 203, a content server 205, a content client 207, a client input device 215, and a client output device 217.

The capture device 200 is shown in FIG. 2 as a Nokia OZO device 200 comprising a microphone array configured to capture audio signals and multiple cameras configured to capture images/video data. The capture device in some embodiments may be one or more apparatus configured to capture suitable media. For example the capture device with respect to the audio capture capability may comprise one or more of a microphone array, an ambisonics capture microphone, or a multi-microphone. The capture device may comprise one or more image/video capture devices such as cameras, depth of field camera, light-field cameras etc. The capture device may comprise one or more positioning devices which enable tracking or otherwise obtaining the position for one or more audio objects or audio sources captured with microphones. In addition to capture device 200, there may be other input methods for providing audio and/or image/video data 202 that will constitute at least a part of the scene. For example, various post-production tools can be used to add or modify audio objects.

The audio and/or image/video data 202 may be passed to the content processor 201. The content processor 201 may be configured to receive the media captured by the capture device or other input device, service or software. In some embodiments the content processor is configured to analyse at least the audio signals to determine parameters or metadata associated with the audio scene. In some embodiments the image/video data may also be used to assist the analysis to determine the metadata. In some other embodiments the image/video data is processed by the content processor 201 to determine the metadata. In some embodiments, at least some of the determination of parameters or metadata associated with the audio scene may be carried out by a user through a user interface.

The content processor 201 can, for example, be a computer (running suitable software stored on memory and on at least one processor), or alternatively a specific device utilizing, for example, FPGAs or ASICs. As shown herein in further detail the audio source or audio object metadata may comprise, for each time-frequency analysis interval, at last one of: a position (such as an azimuth, elevation and distance or a direction and radius from a reference or 'sweet spot') parameter, an energy (such as an energy ratio or gain) parameter, and a size/spread parameter. The parameters may in some embodiments be considered to be spatial audio parameters. In other words the spatial audio parameters comprise parameters which aim to characterize the soundfield.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. These parameters and the media signals may furthermore be passed to the content distribution formatter 203. The content distribution formatter in some embodiments comprises a downmixer configured to receive the multi-channel audio signals and downmix the signals to a determined number of channels and output the downmix signals. For example the downmixer may be configured to generate a 2 audio channel downmix of the multi-channel signals. The determined number of channels may be any suitable number of channels. In some embodiments the downmixer is optional and the multi-channel audio signals are passed unprocessed to an encoder in the same manner as the downmix signal are in this example. In some embodiments, the audio may be represented as a channel-based bed and audio objects, first-order or higher-order ambisonics (FOA/HOA) and audio objects, any combination of these such as audio objects only, or any equivalent spatial audio representation.

Similarly the content distribution formatter 203 may be configured to encode the audio signals and/or spatial audio parameters in order to reduce bit rate, and multiplexed to one stream. The encoding and the multiplexing may be implemented using any suitable scheme. For example, the audio signals may be carried as MPEG-H 3D Audio, specified as ISO/IEC 23008-3 (MPEG-H Part 3), audio coding standard, along with the metadata. Coding of the audio as MPEG-H 3D audio and the additional metadata to enable listener translation and/or interactivity will be specified in the MPEG-I Audio standard.

In some embodiments a content creator, for example a user operating or editing the captured media provides additional information which may be encoded as additional metadata. For example in some embodiments the content creator may be able to add additional information to define at least one interaction parameter associated with the (audio) sources or to add creative intent information or audio effect specification metadata as part of the distribution file format. The distribution file may be the Omnidirectional Media Application Format version 2 specified in MPEG-I part 2 or other suitable format.

This information may for example be specified as metadata which is either delivered in-band with the audio data or out-of-band along with the audio and visual media streams.

The metadata may for example be used to control the behaviour of a specific audio object under the zooming operation and may enable a content playback client to modify the audio rendering.

In general, the audio effect specification metadata may describe the modification characteristics for different audio object parameters under the zooming condition (and possibly other effects) for the different audio object categories. Audio parameters may be at least position parameters (azimuth, elevation, distance), orientation (yaw, pitch, roll), size (controlling perceived spatial extent), and directivity. Alternatively, the audio position parameters could be represented in a Cartesian coordinate system comprising the x, y, z coordinates, or any other suitable position/coordinate representation.

For example, the content creator may be able to input curves and/or functions which determine the change in the different parameters for the different categories under the zooming operation. For example, the content creator may input a degree of change for the spatial extent parameter for an audio object within the zoom region. Correspondingly, the content creator may define a degree of amplitude decrease for an audio object outside the zooming region.

An example format for metadata for identifying an audio scene may be
Relative to Listener

```
{
    <Timestamp>,
        Timestamp,
        Offset,
        <Object>,
            Object ID
            Azimuth,
            Elevation,
            Distance,
            Gain,
            Spatial extent
        </ObjectID>
        <Channel bed>
            Channel bed ID,
            Type of channel bed:4.0,5.0,etc. - loudspeaker
            configuration,
            Orientation,
            Position
        </Channel bed>
    </Timestamp>
}
```

Thus the metadata may define for a timestamp and for an identified object defined by the object ID which has a defined azimuth, elevation, distance, gain, and spatial extent.

An example audio effect specification metadata may in some embodiments may be
Relative to Listener

```
{
    <Object>,
        Object ID (ship)
            Type 1: For example, Default at 1x, Emphasize (increase) and
increase size at zoom level 2x
            Type 2: Default
            Type 3: Default
    </Object>
    <Object>,
        Object ID (Gulls)
            Type 1: For example, Default at 1x, Emphasize (increase gain)
but size remains default at zoom level 2x
            Type 2: Reposition the bird sound
            Type 3: De-emphasize
    </Object>
}
```

The audio effect specification metadata may thus for various objects (here identified as ship and seagull objects) have various effects defined. In the following examples a type 1 object is one in which is part of the default (unzoomed) field of view as well as the zoomed field of view, a type 2 object is one in which is part of the default (unzoomed) field of view but not the zoomed field of view, and a type 3 object one in which it is not part of the default (unzoomed) field of view and not the zoomed field of view.

Examples of type 1, type 2 and type 3 objects for example may be shown with respect to FIGS. 3a and 3b.

FIG. 3a shows an illustration of a user's current default (unzoomed) view in a VR environment. The user sees, a field of view 200, within which is shown a ship 307 at a distance and some birds, gulls 305, closer to the user. The user is also rendered audio related to the scene. For example, the horn of the ship 307 is heard from a distance in front of the user, the screams of the gulls 305 are heard from the front slightly to the left, and in addition there are other sound sources 301, 303 that the user does not currently have in their view. For example, there may be more birds, sounds of people on a beach, and so on. Thus the (audio) sources may be divided into a group 304 of audio sources which are inside the current default view and a group 302 of audio sources which are outside the current default view.

FIG. 3b illustrates the same scene as FIG. 3a with an example overlay 351 of what the user would see at a specific zoom value in the same direction. Here, the birds 305 are no longer part of the user's current view. They have been cropped outside the user's view. The ship 307, while remaining at its original distance, on the other hand now appears to have come much closer to the user (occupying now perhaps 20% of the user's horizontal angle of view). There are thus are now at least three types of audio sources.

Type 1:
Audio sources inside the current zoomed-in crop region (and also therefore also the default region). Such as ship 307 in FIGS. 3a and 3b.

Type 2:
Audio sources inside the current default view but outside the current zoomed-in crop region. Such as birds 305 in FIGS. 3a and 3b.

Type 3:
Audio sources outside the current default view (and therefore also outside the zoomed-in crop region). Such as objects 301 and 303 in FIGS. 3a and 3b.

It is noted that the classification of the audio source may be handled on a dynamic basis. In other words an audio source classification may change over time, for example because of the motion of the user and furthermore the zoom factor applied by the user and/or any motion of the audio source which itself may move (for example the ship may move slowly and the gulls move quickly). In some renderer implementations the audio source classification may also depend on the audio source default rendering position. Thus any process that alters the audio source default rendering position (such as an audio interaction), the current user position (in case of 3DoF+ and particularly 6DoF audio), the current user orientation, and naturally the current user zoom status would potentially change the audio source classification. Thus the audio source classification may be regularly/constantly updated within the content client.

Having generated a suitable media format such as media (audio and video signals), spatial audio parameters (or metadata) and behaviour control metadata these may be passed to a suitable content server 205.

In other words the content server 205 may be configured to receive suitable content (image/video and audio signals) and the metadata such as defined previously.

The content server 205 may be configured to store the formatted signals and transmit these to a content client 207. The signals shown in FIG. 2 are the media data (for example the audio signals, spatial audio metadata and video signals) 208 and the audio effect specification metadata 206.

The content client 207 may be configured to receive the signals such as the media data (for example the audio signals, spatial audio metadata and video signals) 208 and the audio effect specification metadata 206 from the content server 205 and render the signals to a suitable output such as a head mounted display 215 operating as an image/video output and headphones 217 operating as an audio output. Furthermore in some embodiments the content client may be configured to receive inputs from a suitable client input such as the head orientation and translation signals from the head-mounted display, a position/location estimate etc. The inputs may be used as parameters which cause the media signals to be processed or modified before being output. In some embodiments as discussed herein the media signals are modified based on the spatial audio metadata and furthermore based on the audio effect specification metadata.

With respect to FIG. 4a more detailed view of the content client is shown.

The content client in some embodiments comprises a user position/orientation/zoom determiner 401. The user position/orientation/zoom determiner 401 is configured to receive the client input such as a head mounted display position and/or orientation and/or zoom value 316. Having determined the current user position and/or orientation and/or zoom value this can be passed to a viewport determiner 403 and audio selector 402.

The content client in some embodiments comprises a viewport determiner 403. The viewport determiner 403 is configured to receive the current user position and/or orientation and/or zoom value and furthermore may also receive an image input and determine a viewport based on these inputs. The viewport may for example define a field of view range and direction (and may contain information for the default viewport field of view range and direction) and zoomed field of view range and direction which may be passed to the audio classifier 404. Furthermore the viewport determiner 403 may be configured to select from the image input the current viewport based image.

The content client in some embodiments comprises an audio selector 402. The audio selector 402 may be configured to receive the audio signals and metadata and to select suitable audio signals based on the determined current user position and/or orientation and/or zoom factors. The selected audio signals and audio source information may then be output to the audio classifier 404.

The content client may further comprise an audio classifier 404. The audio classifier 404 may be configured to receive the output of the audio selector 402 and furthermore the viewport field of view values (defining for example zoomed and default values). The audio classifier 404 may thus then classify each audio source for example based on the type 1, 2, and 3 classifier example described earlier.

These classifications may be passed to an audio signal processor 406.

The audio signal processor 406 may be configured to at least modify the processing/rendering of the audio signals to be output based on the audio effect specification metadata which defines modification based on the determined source classifications. The modified audio signals may then be passed to the audio-video viewport output 408 to be output to the content client outputs such as the head mounted display and/or headphones.

Figure 4:
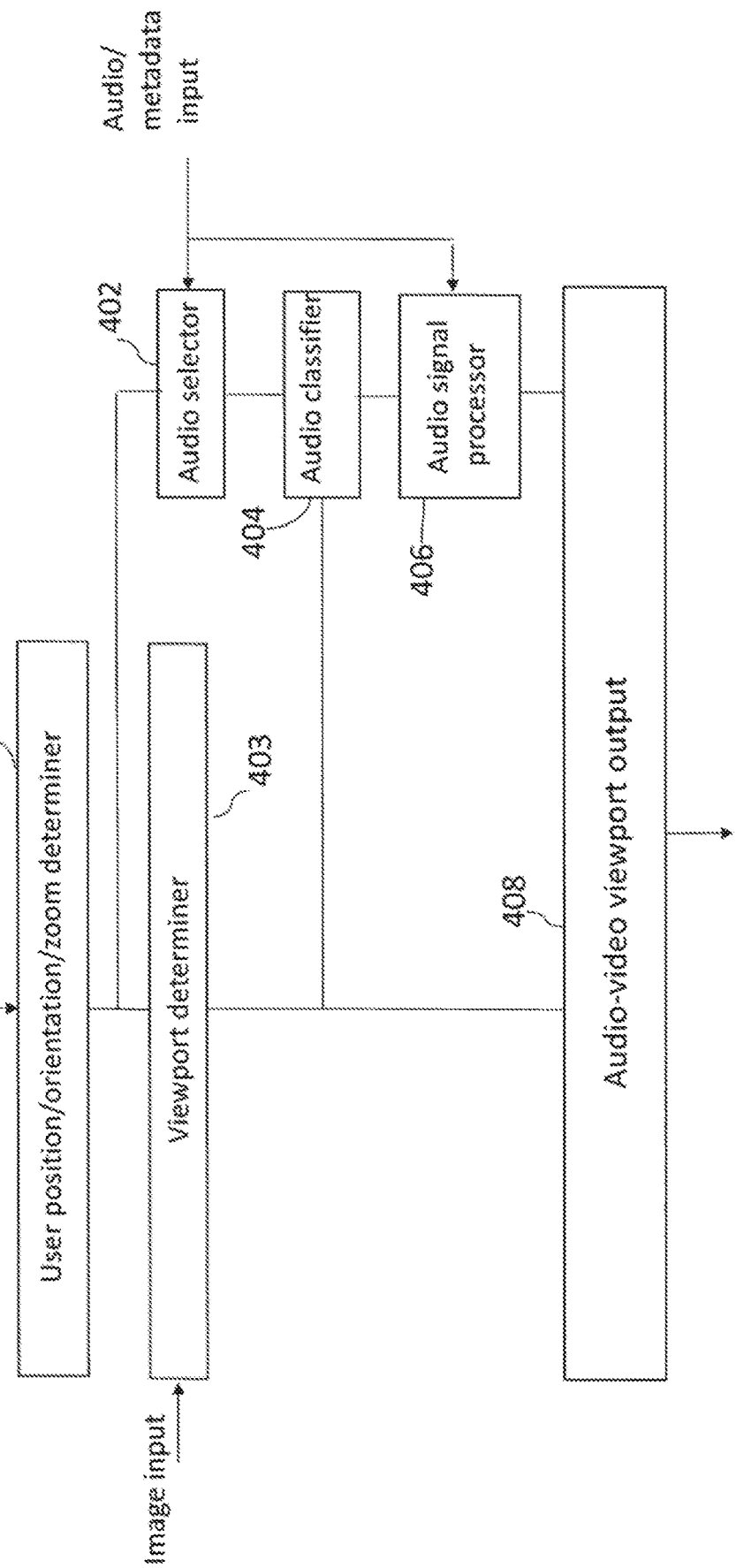
FIG. 4 shows schematically a content client (playback/synthesis device) according to some embodiments.
Figure 5:
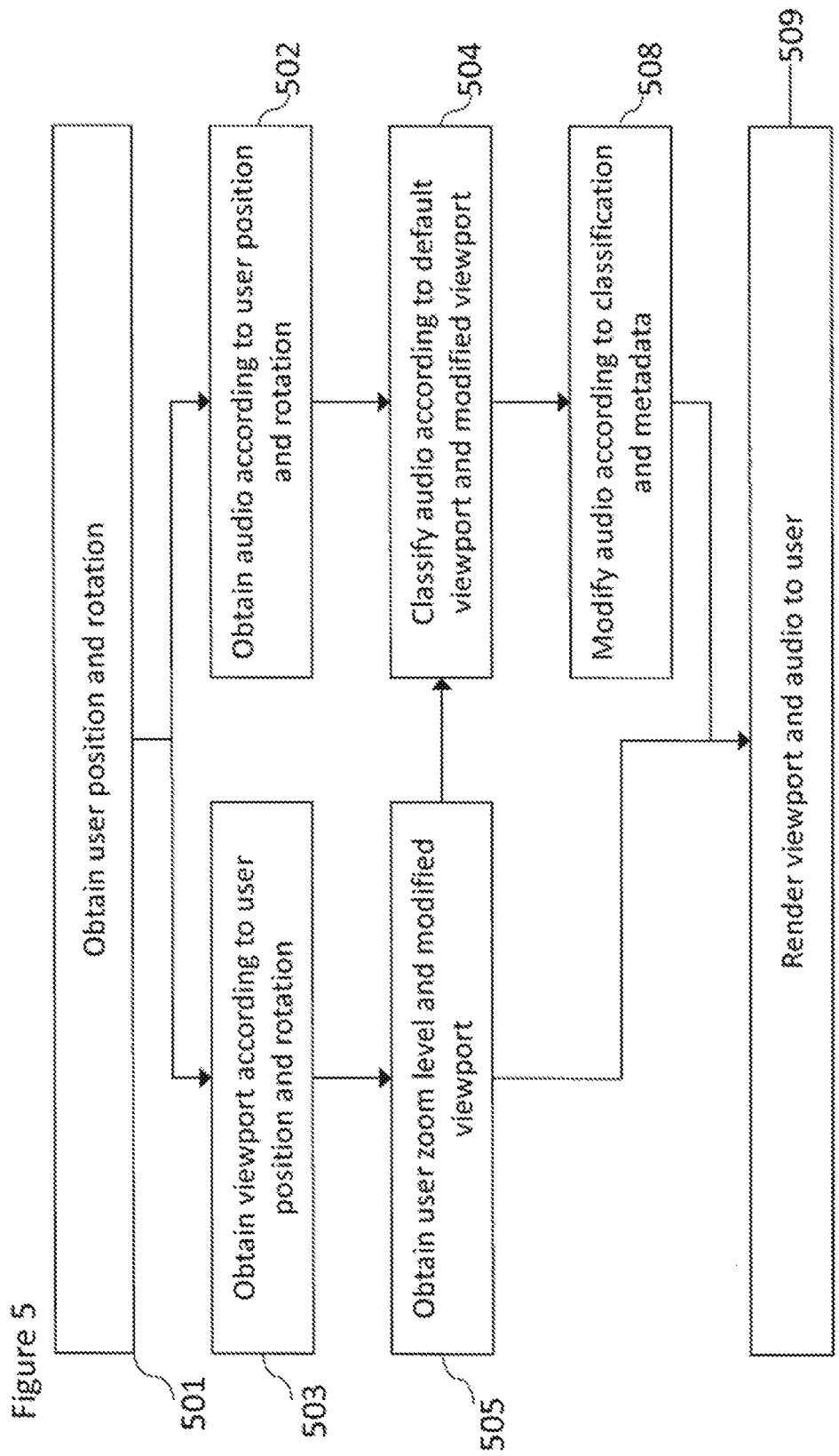
FIG. 5 shows a flow diagram of the operation of the content client shown in FIG. 4 according to some embodiments.

The operations of the content client as shown in FIG. 4 may be represented by the flow diagram shown in FIG. 5.

Thus a first operation may be obtaining a user position and rotation as shown in FIG. 5 by step 501.

Having obtained a user position and rotation a further operation may be one of obtaining a viewport based on the user position and rotation as shown in FIG. 5 by step 503.

Furthermore the zoom level may be obtained and a modified (zoomed) viewport obtained based on the earlier obtained viewport and the zoom level as shown in FIG. 5 by step 505.

Also having obtained the user position and rotation a further operation may be one of obtaining the audio according to the user position and rotation as shown in FIG. 5 by step 502.

Having obtained the audio and the default and modified viewports then the audio may be classified based on the default and modified viewports as shown in FIG. 5 by step 504.

Then the audio is modified according to the classification and furthermore the audio effect metadata as shown in FIG. 5 by step 508.

The viewport and audio may then be rendered to the user as shown in FIG. 5 by step 509.

An example use case is explored with respect to FIGS. 6a to 6c and 7a to 7c.

Figure 6C:
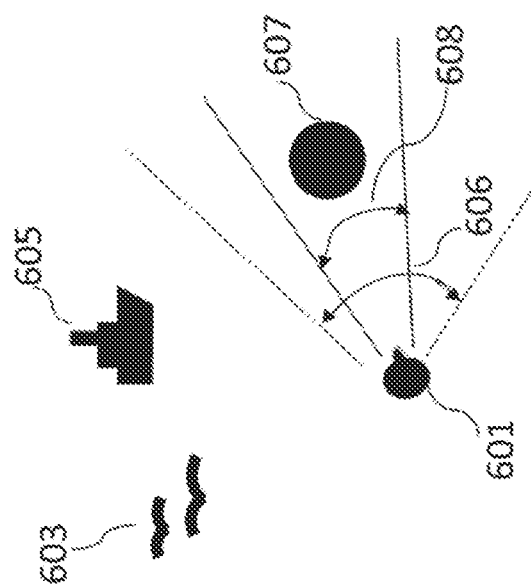
FIGS. 6a to 6c show an example scene suitable for the use of the playback device according to some embodiments.
Figure 6B:
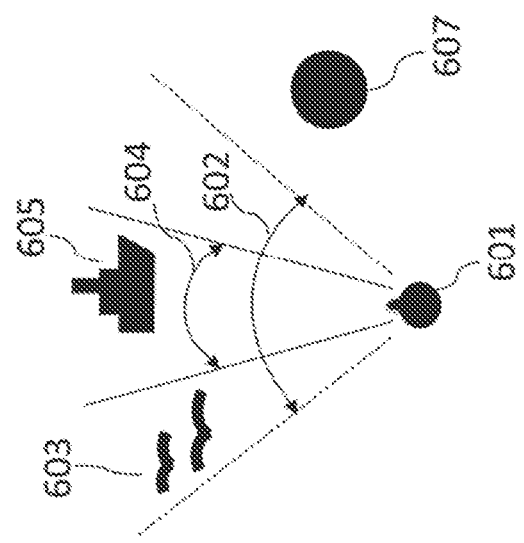
Figure 6A:
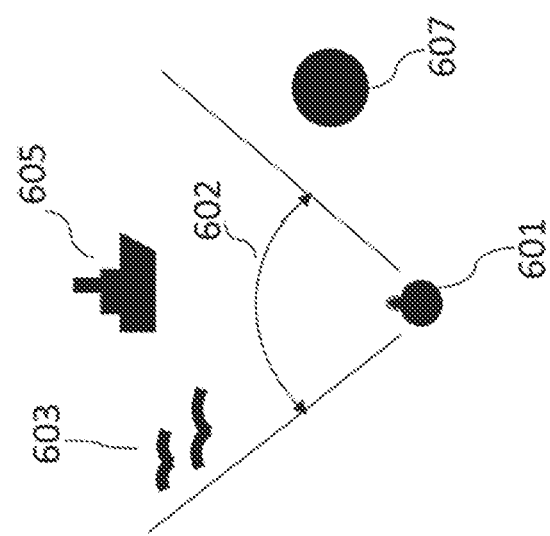

FIGS. 6a to 6c presents a series of illustrations for a scene and zooming operation similar to that shown in FIGS. 3a and 3b. FIG. 6a shows a user 601 who first views a scene including sound sources such as a ship 605 and gulls 603 and a buoy sound source 607. The first view has a first viewport field of view 602 within which is the gull 603 and ship 605.

FIG. 6b shows the user 601 who zooms the scene such that there is a second (zoomed) viewport field of view 604 which is narrower than the first viewport and within which is only the ship 605.

FIG. 6c shows the user 601 who furthermore rotates their view of the scene and has a rotated first viewport field of view 606 (which has the same range as the first viewport field of view 602 but rotated clockwise) and a rotated second viewport field of view 608 (which has the same range as the second viewport field of view but also rotated clockwise). The rotated first and second viewports have the buoy sound source 607 within it.

FIG. 7a shows the example audio rendering modification utilizing the classifications described herein. FIG. 7a shows the user 701 at a first position and rotation and at default zoom level, in other words in the same scenario as shown in FIG. 6a and shows a first dashed circle 703 associated with the gull audio source, a second dashed circle 705 associated with the ship audio source and a third dashed circle 707 associated with the buoy audio source. The dashed circles illustrate the modified audio rendering positions due to zooming (and rotating while zooming).

FIG. 7b shows the user 701 at a first position and rotation and at an increased zoom 710 level, in other words in the same scenario as shown in FIG. 6b and shows a zoom modified first dashed circle 713 associated with the gull audio source which has been moved in a perpendicular direction relative to the first dashed circle, a zoom modified second dashed circle 715 associated with the ship audio source which has an increased spatial extent relative to the second dashed circle and a zoom modified third dashed circle 717 associated with the buoy audio source which has been de-amplified relative to the third dashed circle.

FIG. 7c shows the user 701 at a second rotation and at the same increased zoom level, in other words in the same scenario as shown in FIG. 6c and shows a rotation zoom modified first dashed circle 723 associated with the gull audio source which has been de-amplified relative to the zoom modified first dashed circle, a rotation zoom modified second dashed circle 725 associated with the ship audio source which is de-amplified and has a decreased spatial extent relative to the zoom modified second dashed circle and a rotation zoom modified third dashed circle 727 associated with the buoy audio source which has been amplified and has an increased spatial extent relative to the zoom modified third dashed circle.

In other words when the user zooms into the scene, the gulls fall outside user's current view. Thus, the audio classification status of the gulls changes. As the user rotates, the status of the gulls changes again (now they are no longer inside the default view either). Also, the ship has transitioning outside the default view, while a third audio source has already transitioned into both the default view and the current zoomed-in view.

Furthermore in some embodiments there can be audio that has a specific directional component (such as an audio object with spatial metadata) and audio that is not directional or is not directional relative to the visual content or user position and rotation (for example, a background music may be "head-locked"). The head-locked audio can generally be left unmodified during a zooming operation. Alternatively, some slight effect such as decreasing the level of the head locked audio may be applied to emphasize the effect of zooming. At least for all other audio (scene-audio), the rendering behaviour during zooming should allow for content creator control.

Based on the dynamic viewport-dependent classification, the rendering of at least audio source/objects with accompanying metadata (where the metadata relates to the viewport-dependency) can be modified. In some embodiments, other audio may also be modified. Such modification may be, e.g., within limits derived from a general metadata, scene-specific metadata, or the metadata of the audio objects that are part of the (default) modified audio. For example, if the content carries a parametric spatial audio representation comprising, for example, the direction of arrival, distance, and a ratio parameter for each time-frequency tile of an audio signal such as FOA/HOA or channel-bed, then some modification operations are possible. For example, such parametric spatial audio representation enables adjusting the Direction-of-Arrival (DOA) and/or the level of direct sounds in the parametric spatial audio representation based on the viewport dependent classification, similarly to what can be done to adjust the DOA and level (loudness) of audio objects.

In other words, the degree to which the example audio modification can be performed may depend on the associated metadata. For example, the metadata of the ship audio object may dictate that no zoom-in audio modification is performed for the ship audio. On the other hand, the amount and/or type of the audio modification that is allowed for the gulls and for the third audio may be different based on the metadata. For example, the metadata may define for the gulls that the seagull audio position is to be modified but no de-amplification should be done.

It is noted that the above modifications may either complement or substitute a normal zoom effect on audio rendering, which may be defined, for example, as a listening point translation. For example, if no metadata is input then the audio zooming may be implemented as a listening point translation, which modifies the audio scene such that the apparent listening position is closer to the zoomed region (the levels of direct sounds are increased proportionally to the distance, the DOA of objects is adjusted based on geometry to match with the new listening position).

If the complementing mode is set and a parameter adjustment is done, then the parameter adjustment is applied on top of the listening point translation. An example could be decreasing the level of a sound object outside the zoom region based on the metadata, while still performing the DOA adjustment.

If a substituting mode is set and a parameter adjustment is done, then the parameter adjustment is applied instead of the listening point translation. Thus, the metadata may fully describe the audio content modifications under a zooming operation.

The illustrations and examples present a rotation in the horizontal plane. It is noted that the metadata and the rendering modification may consider horizontal and vertical rotation separately.

The impact of zooming out may be addressed in a different manner. This is because, excessive zooming out operation in 3DOF will result in some content that is by default at the back, to come to the sides. This will result in reduced "share" for the audio content which is part of default view. Consequently, to avoid adverse impact of excessive zoom out, the default view content is kept unchanged (spatial extent of each source is not reduced without limits) and the audio objects which become part of the visible view are handled based on content creator preferences.

In some embodiments this may be implemented in an alternative manner where similar metadata is available for the zoom-out zooming case. A different classification of audio sources may then be made based on similar viewport-dependent information.

Aspects of these embodiments can be implemented at least in AR/VR audio (or audio-visual) content creation tools, the spatial audio metadata (e.g., in a standard bit-stream description) used to transmit the required information, and media rendering devices and/or applications reading the metadata and altering the rendering based on the transmitted information. The content creation tools may be part of a capture device or application. Capture and rendering devices include mobile devices, consumer or professional camera and audio capture setups, AR/VR Head Mounted Displays and media consumption devices (such as the Blu-ray players of the future). In some examples, a media creation, modification or rendering system according to the invention may be at least partly implemented in an edge computing or other cloud service.

In some embodiments aspects of the capture device 200, content processor 201, content distributor formatter 203, content server 205, a content client 207, a client input device 215, and a client output device are implemented within a single device or apparatus. For example in some embodiments an apparatus can comprise capture device components such as camera/microphone which are able to perform zooming/focussing (based on commands or instructions from another entity). The apparatus may accordingly determine a classification for at least one audio object based on the zooming/focussing and transmit the classification (to the entity). The classification defines audio objects within and/or outside of the viewing angle. The zooming/focussing includes digital and/or analogue zooming/focussing and covers both zooming-in and zooming-out.

In other words in some embodiments the default and zoomed viewports are generated at the content capture/analysis/formatting/server as well as the client side rendering embodiments described above. In these embodiments, the processing will generally require a spatial audio capture directional analysis to associate the audio with the directions.

Also in such embodiments having generated the default and zoomed viewports at the content capture/analysis/formatting/server these may be used to also determine the classifications of the audio objects (also at the content capture/analysis/formatting/server side) and which dynamically considers at least three directional audio types: ones that are outside the default view (un-zoomed), ones that are within the default view but outside the current zoomed-in view (which is generally the centre of the default view at some zoom ratio), and inside the zoomed-in view. In some embodiments the metadata rendering information or instructions can be sent separately for each of the audio sources/objects. The renderer client then picks the correct instructions based on its audio classification, which is based on the zoom operation parameters by user (or, in other words, are viewport-dependent).

In some embodiments the apparatus is assisted by a remote camera/microphone system where the remote system communicates with the apparatus and captured data is collected/processed inside the apparatus to achieve the classifications of the audio sources.

In other words in some embodiments a (remote) server sends content to an apparatus. The apparatus performs the classification of the sources.

In some embodiments the apparatus is assisted by a remote camera/microphone system where the remote system communicates with the apparatus, captured data is collected inside the apparatus, the apparatus transmits captured data to another entity where processing takes place to achieve such classification system.

In other words a remote system sends content and further assistance to the apparatus. The apparatus is configured to subsequently perform classification based on a determined zoom level.

In some further embodiments the apparatus is assisted by a remote camera/microphone system where the camera/microphone remote system communicates with the apparatus, captured data is collected inside the apparatus, the apparatus transmits the captured data to another entity where processing takes place, the processed information is transmitted to a further entity to achieve such classification system where the further entity transmits such classification.

In other words there may be embodiments where there is a transmission of captured data to another entity for processing. The processed output is sent to another entity to perform classification and the output of classification is sent to another entity.

Figure 8:
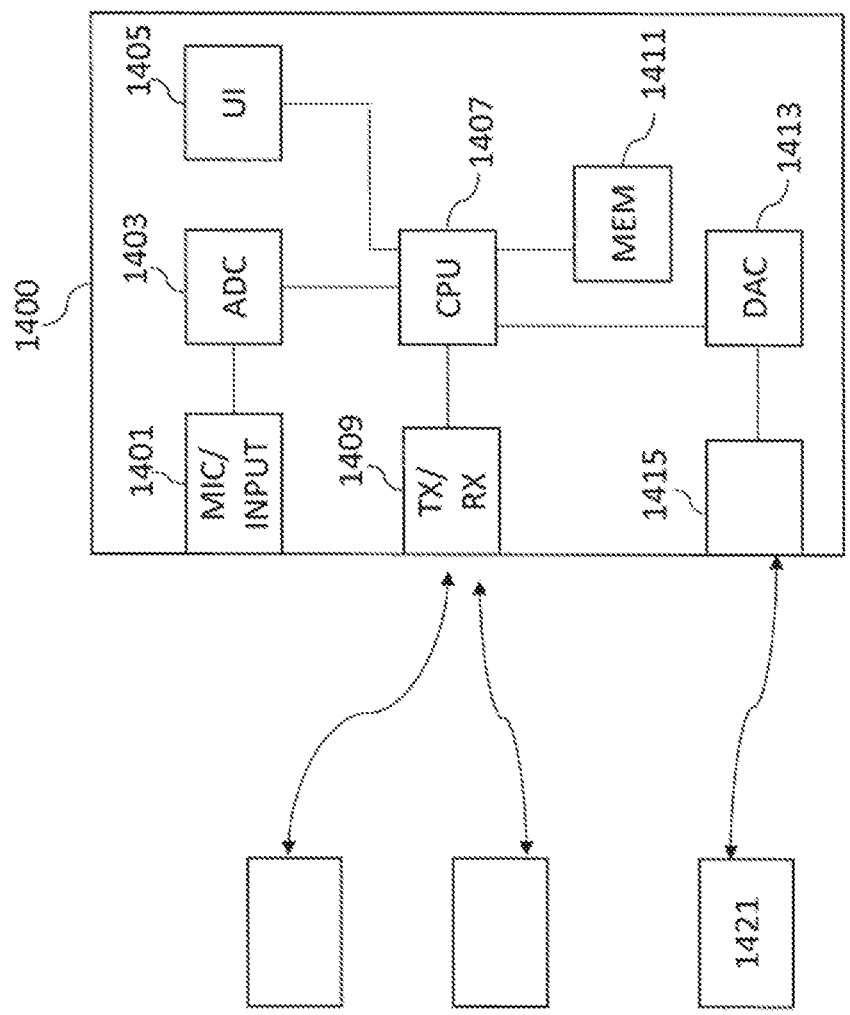
FIG. 8 shows schematically an example device suitable for implementing the apparatus shown in FIGS. 2 and 4.

With respect to FIG. 8 an example electronic device which may be used as the content client device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one processor, and
   at least one non-transitory memory including computer code for one or more programs, the at least one memory and the computer code configured, with the at least one processor, to cause the apparatus at least to:
   obtain audio signals related to one or more audio sources; and
   generate audio effect information for the one or more audio sources, wherein the audio effect information enables control of audio signal processing associated with the obtained audio signals based, at least partially, on respective classifications of the one or more audio sources and a zoom factor,
   wherein at least one classification, of the respective classifications, of at least one audio source of the one or more audio sources is based on:
   whether the at least one audio source is located in a zoomed field of view defined with the zoom factor, and
   whether the at least one audio source is located in an unzoomed field of view, wherein the zoomed field of view and the unzoomed field of view at least partially overlap, wherein the unzoomed field of view is at least partially different from the zoomed field of view.

2. The apparatus as claimed in claim 1, wherein the apparatus is further configured to generate at least one of:
   an identifier configured to identify the at least one audio source from the one or more audio sources; or
   at least one audio signalling processing effect to be applied based on the at least one classification of the at least one audio source.

3. The apparatus as claimed in claim 2, wherein the at least one audio signalling processing effect comprises at least one of:
   an emphasis in gain;
   a de-emphasis in gain;
   an increase in spatial extent; or
   a decrease in spatial extent.

4. The apparatus as claimed in claim 2, wherein the at least one classification of the at least one audio source is at least one of:
   a first classification where the at least one audio source is within a first viewport for a first zoom factor and within a second viewport for a second zoom factor;
   a second classification where the at least one audio source is not within the first viewport for the first zoom factor but within the second viewport for the second zoom factor; or
   a third classification where the at least one audio source is not within the first viewport for the first zoom factor and not within the second viewport for the second zoom factor.

5. The apparatus as claimed in claim 1, where the apparatus is further configured to:
   analyse the audio signals to generate information related to the one or more audio sources; and
   transmit the audio signals, the information related to the one or more audio sources and the audio effect information to at least one further apparatus.

6. The apparatus as claimed in claim 1, wherein the apparatus is further configured to at least one of:
   capture the audio signals; or
   receive the audio signals from at least one audio capture apparatus.

7. The apparatus as claimed in claim 5, where the apparatus is further configured to:
   capture at least one image, the at least one image being associated with the one or more audio sources; and
   transmit the at least one image with the audio signals, the information related to the one or more audio sources and the audio effect information to the at least one further apparatus.

8. The apparatus as claimed in claim 5, wherein the apparatus is configured to transmit the audio effect information as one of:
   in-band information with the audio signals; or
   out-of-band information with the audio signals.

9. An apparatus comprising:
   at least one processor, and
   at least one non-transitory memory including computer code for one or more programs, the at least one memory and the computer code configured, with the at least one processor, to cause the apparatus at least to:
   receive at least one audio signal;

receive information associated with at least one audio source;
receive audio effect information, the audio effect information associated with the at least one audio source; and
process the at least one audio signal based on the information, the audio effect information, a zoom factor, and a classification of the at least one audio source,
wherein the classification of the at least one audio source is configured to indicate:
   whether the at least one audio source is located in a zoomed field of view defined with the zoom factor, and
   whether the at least one audio source is located in an unzoomed field of view, wherein the zoomed field of view and the unzoomed field of view at least partially overlap, wherein the unzoomed field of view is at least partially different from the zoomed field of view.

10. The apparatus as claimed in claim 9, wherein the apparatus is further configured to:
determine a first viewport based on at least one of: an obtained position or an obtained rotation;
determine a second viewport based on the at least one of the obtained position or the obtained rotation and a second zoom factor;
classify the at least one audio source based on the information associated with the at least one audio source, the first viewport, and the second viewport; and
select at least one audio signalling processing effect to be applied based on the classification of the at least one audio source.

11. The apparatus as claimed in claim 9, wherein the apparatus is further configured to receive at least one of:
an identifier configured to identify the at least one audio source; or
at least one audio signalling processing effect to be applied based on the classification of the at least one audio source.

12. The apparatus as claimed in claim 11, wherein the at least one audio signalling processing effect comprises at least one of:
an emphasis in gain;
a de-emphasis in gain;
an increase in spatial extent; or
a decrease in spatial extent.

13. The apparatus as claimed in claim 9, wherein the classification of the at least one audio source comprises at least one of:
a first classification where the at least audio source is within a first viewport for a first zoom factor and within a second viewport for a second zoom factor;
a second classification where the at least audio source is not within the first viewport for the first zoom factor but within the second viewport for the second zoom factor; or
a third classification where the at least audio source is not within the first viewport for the first zoom factor and not within the second viewport for the second zoom factor.

14. The apparatus as claimed in claim 10, where the apparatus is further configured to:
receive at least one image;
apply the second viewport to the at least one image to generate an output image; and
cause display of the output image.

15. The apparatus as claimed in claim 9, where the apparatus is further configured to cause output of the processed at least one audio signal as a rendered audio signal.

16. A method comprising:
obtaining audio signals related to one or more audio sources; and
generating audio effect information for the one or more audio sources, wherein the audio effect information enables control of audio signal processing associated with the obtained audio signals based, at least partially, on respective classifications of the one or more audio sources and a zoom factor,
wherein at least one classification, of the respective classifications, of at least one audio source of the one or more audio sources is based on:
   whether the at least one audio source is located in a zoomed field of view defined with the zoom factor, and
   whether the at least one audio source is located in an unzoomed field of view, wherein the zoomed field of view and the unzoomed field of view at least partially overlap, wherein the unzoomed field of view is at least partially different from the zoomed field of view.

17. A method comprising:
receiving at least one audio signal;
receiving information associated with at least one audio source;
receiving audio effect information, the audio effect information associated with at least one audio source; and
processing the at least one audio signal based on the information associated with at least one audio source, the audio effect information, a zoom factor, and a classification of the at least one audio source
wherein the classification of the at least one audio source is configured to indicate:
   whether the at least one audio source is located in a zoomed field of view defined with the zoom factor, and
   whether the at least one audio source is located in an unzoomed field of view, wherein the zoomed field of view and the unzoomed field of view at least partially overlap, wherein the unzoomed field of view is at least partially different from the zoomed field of view.

18. The method as claimed in claim 17, wherein the processing the at least one audio signal is further comprising:
determining a first viewport based on at least one of: an obtained position or an obtained rotation;
determining a second viewport based on at least one of the obtained position or the obtained rotation, and a second zoom factor;
classifying the at least one audio source based on the information associated with the at least one audio source, the first viewport, and the second viewport; and
selecting at least one audio signalling processing effect to be applied based on the classification of the at least one audio source.

19. The method as claimed in claim 16, wherein the generating the audio effect information is further comprising generating at least one of:
an identifier for identifying the at least one audio source from the one or more audio sources; or
at least one audio signalling processing effect to be applied based on the at least one classification of the at least one audio source.

20. The method as claimed in claim 16, further comprising:
- analysing the audio signals for generating information related to the one or more audio sources; and
- transmitting the audio signals, the information related to the one or more audio sources and the audio effect information to at least one further apparatus.

\* \* \* \* \*